United States Patent [19]

Leussler

[11] Patent Number: 4,931,265

[45] Date of Patent: Jun. 5, 1990

[54] CONDITIONING PROCESS FOR DUST-CONTAINING WASTE GAS

[75] Inventor: Wilhelm Leussler, Frankfurt, Fed. Rep. of Germany

[73] Assignee: Metallgesellschaft Aktiengesellschaft, Frankfurt am Main, Fed. Rep. of Germany

[21] Appl. No.: 151,780

[22] Filed: Feb. 3, 1988

[30] Foreign Application Priority Data

Feb. 4, 1987 [DE] Fed. Rep. of Germany ....... 3703266

[51] Int. Cl.⁵ .......................................... C01B 17/765
[52] U.S. Cl. .................................... 423/244; 423/533
[58] Field of Search .......................... 55/5, 122, 135; 423/522, 533, 215.5, 535, 244; 126/110 B, 108; 219/308, 309, 364, 381, 382

[56] References Cited

U.S. PATENT DOCUMENTS

| | | | |
|---|---|---|---|
| 3,517,162 | 6/1970 | Webb | 219/364 |
| 3,993,429 | 11/1976 | Archer | 55/5 |
| 4,213,447 | 7/1980 | Erickson | 236/49 R |
| 4,290,480 | 9/1981 | Sulkowski | 236/44 C |
| 4,466,815 | 8/1984 | Southam | 423/522 |
| 4,604,516 | 8/1986 | Metz | 219/364 |
| 4,706,736 | 11/1987 | Gyori | 219/364 |

FOREIGN PATENT DOCUMENTS

| | | | |
|---|---|---|---|
| 119878 | 1/1986 | Canada | 423/522 |
| 0062930 | 10/1982 | European Pat. Off. | 423/533 |
| 789386 | 12/1980 | U.S.S.R. | 423/533 |

Primary Examiner—John Doll
Assistant Examiner—R. Bruce Breneman
Attorney, Agent, or Firm—Felfe & Lynch

[57] ABSTRACT

Disclosed is an improved process for the production of a sulfur trioxide conditioning gas, which consists in compensating the faulty "ambient gas temperature" in a simple and effective manner, such that all of the subsequent functions can take place at the established optimum temperature and can no longer be adversely affected by fluctuations in the ambient air temperature.

11 Claims, 1 Drawing Sheet

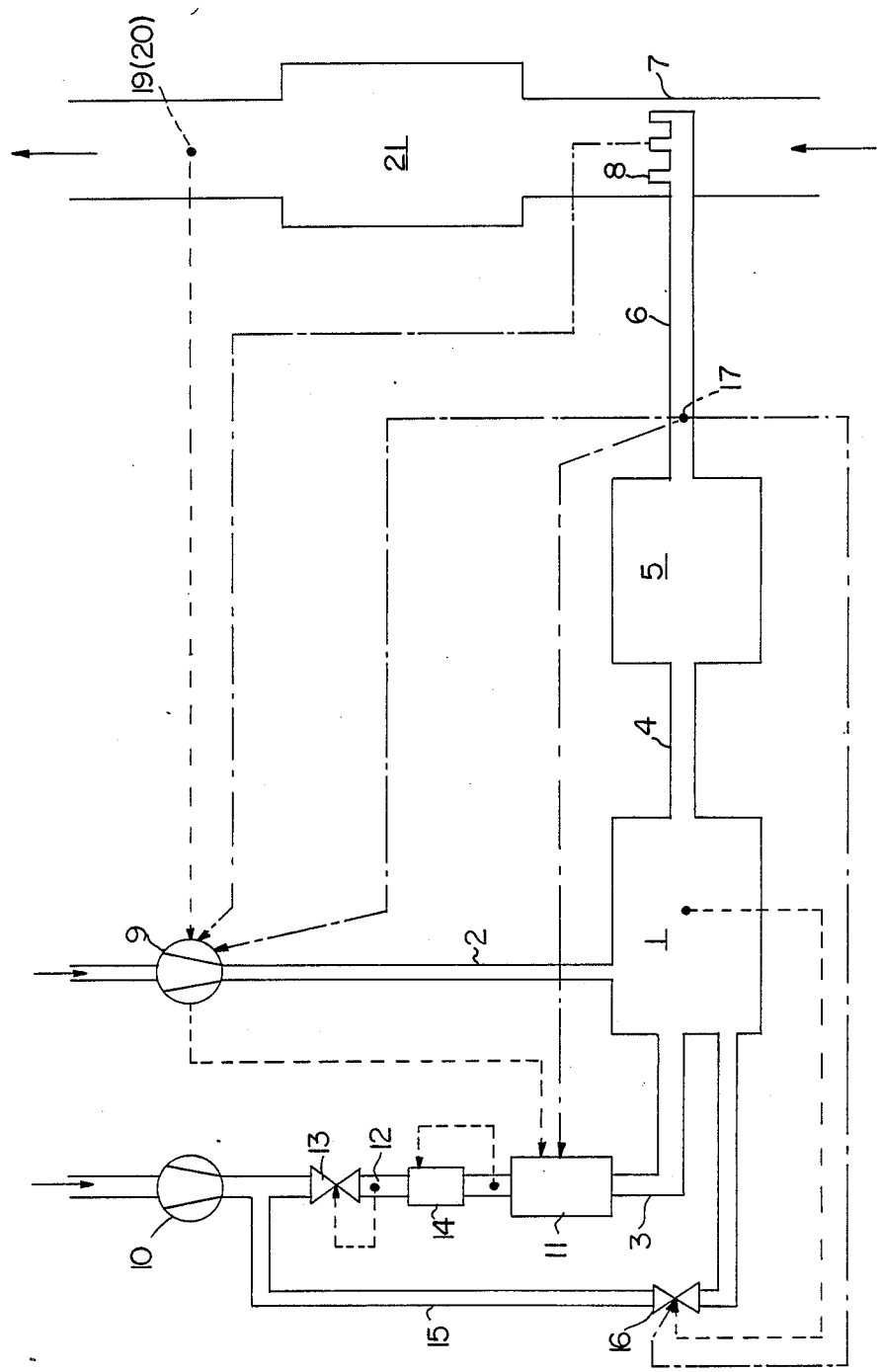

CONDITIONING PROCESS FOR DUST-CONTAINING WASTE GAS

BACKGROUND OF THE INVENTION

The present invention is in a process for conditioning an exhaust gas stream containing dust, before it enters an electrical dust precipitator. The exhaust gas is conditioned by the addition of a conditioning gas containing sulfur trioxide. The $SO_3$ is produced in a system which includes a furnace with conduits for introducing molten sulfur and combustion air into the furnace, and a gas exhaust conduit for removal of gas from the furnace. The furnace exhaust gas is fed into a catalytic converter connected to the gas exhaust conduit. A conduit carries the gas from the converter to the exhaust gas passage and has a terminal distributing means. The molten sulfur is pumped and metered into the furnace according to a measured magnitude representing the amount of conditioning gas needed. The combustion air is delivered to the furnace by a blower for delivering a sufficient amount of air. An air heater is provided between the blower and furnace. The air heater output is controlled directly in accordance with the amount of sulfur delivered such that the sum of the energy fed to the furnace with the sulfur and with the heated air is constant.

A process for producing a flue gas conditioning gas stream is disclosed in EP-A-O 062 930. It differs from other previously known processes in that the sulfur trioxide producing apparatus is adjusted by an external signal to the sulfur trioxide demand, but that the essential function is taken over internally by a simple control which assures that a constant amount of energy is fed to the furnace for the sulfur combustion, so that the output temperature can be kept substantially constant in a simple manner.

In the known processes, a number of additional possibilities for control and correction are provided, and the result is that, for the person skilled in the art, the central control is either not capable alone of solving the complex control problem, or else requires complex secondary regulating circuits in order to compensate for all fluctuations that occur, such as the ambient temperature, for example.

SUMMARY OF THE INVENTION

The present invention is directed at a new process and especially of proposing a clear regulation and control structure in which safety engineering requirements are not neglected.

For the solution of this problem it is proposed that, in the process referred to above, a constant amount of air is delivered to the furnace. The amount of air is 4.5 to 5 times that needed for the stoichiometric combustion of the maximum anticipated amount of sulfur. The amount of air fed to the air heater is regulated to a constant temperature.

The amount of air is regulated to a constant amount in a known manner by means of an aperture and control damper. In another aspect of the invention an auxiliary air heater is provided between the blower and air heater, which is controlled according to a temperature measured between the auxiliary air heater and the main air heater.

For safety considerations the sulfur delivery can be interrupted (or remain shut off) whenever the temperature in the area of the apparatus for distributing the sulfur trioxide-containing conditioning gas falls below a level that is critical for the avoidance of sulfuric acid corrosion (or has not yet been reached after starting out from lower temperatures).

In yet another aspect of the process of the invention and also for safety concerns, a by-pass provided with a control valve and branching off between the blower and control valve, and leading directly into the furnace can be provided, by which cooling air is delivered into the furnace if a temperature limit is exceeded. It is furthermore advantageous to provide a temperature measuring point downstream from the converter and, when a temperature limit is exceeded, the delivery of sulfur and the air heater output are immediately shut off entirely, and the control damper in the by-pass line is immediately opened.

Lastly, to determine the conditioning gas demand, a system for measuring the dust content of the clean gas is provided in the exhaust gas stream behind the electrostatic dust precipitator, or a system in provided for measuring the exhaust gas flow for the same purpose.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWING

The FIGURE schematically represents a system according to the invention.

DESCRIPTION OF PREFERRED EMBODIMENT

Referring to the drawing, molten sulfur is fed through line 2 and combustion air through line 3 into the sulfur burning furnace 1. A mixture of air and combustion products is exhausted from furnace 1 through the gas exhaust line 4. The rate of flow of the combustion air is substantially greater than that necessary for a stoichiometric combustion of the sulfur. It is proportioned such that, (a) the mixture entering the converter 5 still contains enough oxygen for the catalytic conversion of the sulfur dioxide content to sulfur trioxide, and (b) it is at a temperature favorable for the conversion to $SO_3$. In the case of the commonly used catalysts containing vanadium pentoxide, this temperature is 420° to 480° C. (788° to 896° F.). In order furthermore to be able to maintain very steady temperature and flow conditions in the entire system, the air delivery is also kept constant independently of the sulfur input.

The $SO_3$ containing conditioning gas is fed through the gas delivery line 6 and the distributors 8 into the exhaust gas duct 7, where it is uniformly distributed in the exhaust gas stream before the latter enters the electrostatic dust precipitator 21. The sulfur trioxide demand can be determined by measuring the clean gas dust content 19 and/or the rate of flow of the exhaust gas 20. The means 9 for pumping and metering the sulfur is tied into a control circuit with the point of measurement 19, 20, so that the sulfur feed is automatically adjusted to the current demand.

The combustion air is delivered through the blower 10 and the duct 3 into the furnace 1. The air flow is kept constant by means of an aperture 12 and control valve 13. If it is desired to maintain a constant temperature in the converter 5 at a constant air feed to the furnace while the sulfur feed varies, then, at sulfur inputs below the maximum anticipated amount, energy has to be supplied to the furnace 1 from another source. In the state of the art, an air heater 11 is provided for this purpose in duct 3, and its power is controlled directly according to the sulfur feed such that the total energy fed to the furnace with the sulfur and with the (more or less) heated combustion air is constant. This very simple and virtually lag-free control system is not, however, of equalizing all fluctuations of the ambient temperature. Air temperature fluctuations, which can amount to as much as 50° or 60° C., depending on geographical location, can produce effects of the same order of magnitude in converter 5 unless additional measures are taken. To avoid such fluctuations and to continuously run converter 5 as close as possible to the optimum temperature, an auxiliary air heater 14 is provided, which is controlled from a point of temperature measurement between the auxiliary air heater 14 and the main air heater 11. Such an arrangement provides an air stream of unvarying temperature which is fed to the air heater 11. The control system for the sulfur trioxide producing apparatus to be used according to the invention is thus complete.

The remainder of the measures are intended to avoid damage to the apparatus during start-up or shut-down, or when its operation is disturbed. The first measure is for the protection of the furnace against overheating. There is a possibility that the molten sulfur will not burn completely for a brief period, so that the $SO_3$ demand is not covered, and excess sulfur is delivered to the furnace. Normally, such a sulfur overfeed is equalized in the furnace by a delayed, higher rate of combustion before appreciable overheating occurs. Occasionally, however, a greater sulfur overfeed occurs which then, on account of the excess of combustion air that is always present, can lead to sudden high combustion rates with a corresponding excess temperature. For such cases a temperature sensor is provided in the furnace 1, which results in actuation of a control valve 16 in a by-pass line 15, so that unheated air quickly can be introduced into the furnace to promptly reduce overheating. This is executed by a control circuit, because generally it is not necessary, in the case of such sporadically occurring overheating, to put great amounts of auxiliary air into the furnace 1, possibly cooling it down to a temperature below the ignition temperature.

The remainder of the measures are important for the plant start-up or for an emergency shut-down thereof (broken lines). A temperature sensor in the area of the distributor 8 insures that apparatus 9 for pumping and controlling the flow of sulfur is in operation only if a sufficiently high temperature above the critical level for sulfuric acid corrosion is measured at this point. Accordingly, the apparatus 9 will not operate until the system has been raised to the required temperature by the delivery of heated combustion air. Likewise, this apparatus is shut off if the temperature falls below the required level due to some disturbance.

Finally, the temperature of the converter exhaust gas is measured at 17. When a temperature limit is exceeded at the converter output, a signal is generated which immediately shuts off both the sulfur feed and the air heater power. Control valve 16 is opened so that the entire apparatus can be cooled down as quickly as possible. This is an emergency shut-down for the entire system, the immediate result of which is that production of $SO_3$ is temporarily halted. In some cases measures must also be taken in the main system from which the exhaust gas originates. In any case, the sulfur trioxide production apparatus must then be placed back in operation.

It will be understood that the specification and examples are illustrative but not limitative of the present invention and that other embodiments within the spirit and scope of the invention will suggest themselves to those skilled in the art.

I claim:

1. A process for conditioning a dust containing gas stream prior to its introduction into an electrostatic separator comprising:
   introducing molten sulfur into a furnace;
   introducing combustion air into said furnace at a constant rate in an amount of 4.5 to 5 times that required for stoichiometric combustion of the maximum sulfur rate;
   combusting said sulfur in said furnace to produce a gas mixture containing air and $SO_2$;
   exhausting the gas mixture from the furnace;
   introducing said gas mixture into a catalytic converter;
   converting $SO_2$ to $SO_3$ in said catalytic converter;
   exhausting an $SO_3$-containing gas stream from the catalytic converter;
   introducing the $SO_3$-containing gas stream into the dust containing gas through distribution means;
   interrupting the sulfur feed when the temperature in the area of the distribution means falls below a critical value, the critical value being determined so as to avoid sulfuric acid corrosion;
   measuring a parameter of the gas stream when exhausted from the electrostatic separator and controlling the introduction of sulfur into said furnace in dependence on the measurement;
   maintaining a constant amount of thermal energy supplied to the furnace by controlling the sulfur feed rate and by controlling an amount of preheat added in a preheater to the combustion air prior to its introduction into said furnace, the amount of preheat being controlled in dependence on the sulfur feed rate; and
   regulating the temperature of combustion air supplied to the preheater.

2. The process of claim 1 wherein the amount of combustion air is regulated to a constant value by way of an aperture or orifice and a regulating valve.

3. The process of claim 1 wherein the temperature of the air introduced into the preheater is regulated in dependence on a temperature measured between an auxiliary-air heater and the preheater.

4. The process of claim 3 wherein a constant temperature is preset to a value which corresponds to that value reached without any preheating by the auxiliary air heater in case of maximum ambient temperature.

5. The process of claim 1 further comprising cooling the furnace when a temperature in the furnace indicates an overheated condition therein.

6. The process of claim 5 wherein the furnace is cooled by an air stream from the same source as the combustion air but which has by-passed the heater, preheater and regulating valve.

7. The process of claim 1 wherein the $SO_3$ requirement is determined by a measuring of the dust content in the gas out of the electrostatic separator.

8. The process of claim 1 wherein the SO$_3$ requirement is determined by measuring the gas amount out of the electrostatic separator.

9. The process of claim 1 wherein the sulfur feed rate is determined by measuring the amount of dust containing gas to be treated and the dust content in the gas stream leaving the electrostatic precipitator.

10. The process of claim 1 wherein the temperature of the gas stream is measured downstream of the converter prior to the distribution means and in the case of exceeding a preset limit immediately
 (a) the sulfur supply to the furnace is interrupted
 (b) any air preheating is stopped and
 (c) the duct by-passing the air preheaters and the regulating valve is completely opened.

11. The process of claim 1 wherein the temperature in the region of the distribution means is below said critical value during start-up.

* * * * *

UNITED STATES PATENT AND TRADEMARK OFFICE
CERTIFICATE OF CORRECTION

PATENT NO. : 4,931,265

DATED : June 5, 1990

INVENTOR(S) : Wilhelm Leussler

It is certified that error appears in the above-identified patent and that said Letters Patent is hereby corrected as shown below:

Column 3, line 10, "however, of" should read --however, capable of--.

Signed and Sealed this

Twenty-first Day of April, 1992

Attest:

HARRY F. MANBECK, JR.

*Attesting Officer*  *Commissioner of Patents and Trademarks*